(12) United States Patent
Chen

(10) Patent No.: US 7,095,846 B2
(45) Date of Patent: Aug. 22, 2006

(54) HALF DUPLEX DEVICE AND SIGNAL PROCESSING METHOD THEREOF

(75) Inventor: Yueh-Chang Chen, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 13 days.

(21) Appl. No.: 10/895,904

(22) Filed: Jul. 22, 2004

(65) Prior Publication Data
US 2005/0249135 A1   Nov. 10, 2005

(30) Foreign Application Priority Data
May 5, 2004   (TW) ................ 93112618 A

(51) Int. Cl.
*H04M 1/00* (2006.01)
*H04M 9/00* (2006.01)

(52) U.S. Cl. .............. 379/388.06; 379/388.05; 379/395.01; 379/390.02

(58) Field of Classification Search ............... 379/378, 379/388.06
See application file for complete search history.

(56) References Cited

U.S. PATENT DOCUMENTS

| | | | | |
|---|---|---|---|---|
| 5,699,424 A | * | 12/1997 | Hirano ................ | 379/406.11 |
| 5,737,407 A | * | 4/1998 | Graumann ............ | 379/388.04 |
| 5,764,753 A | * | 6/1998 | McCaslin et al. ...... | 379/406.07 |
| 6,141,415 A | * | 10/2000 | Rao ..................... | 379/406.08 |
| 6,198,819 B1 | * | 3/2001 | Farrell et al. .......... | 379/406.08 |
| 2003/0220786 A1 | * | 11/2003 | Chandran et al. ....... | 704/205 |

* cited by examiner

*Primary Examiner*—Fan Tsang
*Assistant Examiner*—Ramnandan Singh
(74) *Attorney, Agent, or Firm*—Birch, Stewart, Kolasch, and Birch, LLP

(57) ABSTRACT

A half duplex device and signal processing method thereof. First, a signal detection unit of a signal detector of a half duplex device obtains a short-term power and long-term power. Next, a data update unit of the signal detector sets a short-term power threshold as a default threshold, determines whether the long-term power is greater than the default threshold, sets the short-term power threshold value equal to the long-term power value if the long-term power value is greater than the default threshold value, and provides smooth performance in a noisy environment.

5 Claims, 8 Drawing Sheets

HALF DUPLEX DEVICE AND SIGNAL PROCESSING METHOD THEREOF

BACKGROUND

The present invention relates to signal communication, and in particular to a half duplex device and signal processing method thereof.

Currently, since the distance between a speaker and a microphone of a handfree mobile device is very short, vocal signals from a remote user broadcast by the speaker may be received by the microphone, and returned to the remote user, resulting in an echo. One solution to this problem employs a full duplex controller with an echo canceller. This method requires learning echo impulse response produced by the environment. Noise from different surroundings may result in a long echo duration, resulting in the echo canceller being unable to accurately and rapidly eliminate the echo impulse response.

Another method employs a half duplex controller. FIG. 1 is a schematic diagram of the architecture of a half duplex device, comprising a line detector 110, a line suppressor 120, a half duplex controller 200, an audio detector 310, and an audio suppressor 320. A signal process for a half duplex device is described in the following.

Line detector 110 detects whether vocal signals from a remote user 100 are present, and sends a signal value to half duplex controller 200 according to the detection result, a signal process for line detector 110 is described in FIG. 2.

FIG. 2 is a flowchart of the signal process of the line detector shown in FIG. 1. First, no vocal signal from remote user 100 is present (Line.Active=0) (step S11). Next, line detector 110 determines whether a short-term power value produced by vocal signals is greater than a short-term power threshold value (Line.Short.Term.Power>Line.Short.Term.Power.Thershold?) (step S12). If so, the process proceeds to step S131, and, if not, proceeds to step S132.

If the short-term power value is greater than the short-term power threshold value, indicating vocal signals from remote user 100 are present, line detector 110 outputs Line.Active=1 to half duplex controller 200 (step S131). The short-term power value is less than the short-term power threshold value, indicating no vocal signal from remote user 100 is present, such that line detector 110 outputs Line.Active=0 to half duplex controller 200 (step S132), and the process continues to step S12.

Further, in step S12, vocal signal determination is also implemented by determining whether a line power deviation is greater than a line deviation threshold. The line power deviation is the modulus of the difference between a long-term power and a short-term power. At the beginning of a conversation with remote user 100, vocal signals with low sound produce small rise to the short-term power. Although the short-term power value produced by the vocal signals does not exceed the short-term power threshold value thereof, the line power deviation may be great. Because the long-term power remains, it is acknowledged that vocal signals presenting when the line power deviation is greater than the line deviation threshold, compensation for low volume sections at the beginning and the end of the conversation is required.

In addition, a signal process for audio detector 310 is identical with that for line detector 110, described in FIG. 2.

Line detector 110 and audio detector 310 detect whether vocal signals from remote user 100 and receiver 300 are present respectively, and half duplex controller 200 then determines whether to allow vocal signals from remote user 100 or receiver 300 to present first as shown in FIG. 3.

First, line suppressor 120 and audio suppressor 320 are inactivated (Line.Suppress.Active=0 and Audio.Suppress.Active=0) (step S21). Next, half duplex controller 200 determines whether vocal signals from remote user 100 are present and line suppressor 120 is inactivated (Line.Active=1 and Line.Suppress.Active=0) (step S22). If so, the process continuous to step S231, and, if not, to step S232.

Audio suppressor 320 is activated when vocal signals from remote user 100 are present (Audio.Suppress.Active=1) (step S231), preventing vocal signals from receiver 300 from entering, and the process continuous to step S22. Audio suppressor 320 remains in an inactive state when no vocal signal from remote user 100 is present (Audio.Suppress.Active=0) (step S232).

Next, half duplex controller 200 determines whether vocal signals from receiver 300 are present and audio suppressor 320 is inactive (Audio.Active=1 and Audio.Suppress.Active=0) (step S24). If so, the process continuous to step S251, and, if not, to step S252. Line suppressor 120 is activated when vocal signals from receiver 300 are present (Line.Suppress.Active=1) (step S251), preventing vocal signals from remote user 100 from presenting, and the process continuous to step S22. Line suppressor 120 remains in an inactive state when no vocal signal from receiver 300 is present (Line.Suppress.Active=0) (step S252).

Half duplex controller 200 suppresses vocal signals from receiver 300 when vocal signals from remote user 100 are present. A short-term power threshold, however, and line deviation threshold of half duplex controller 200 are predetermined. When remote user 100 is in a noisy environment, such as a subway station, the background noise exceeds the short-term power threshold, causing line detector 110 to receive successive vocal signals from remote user 100. Audio suppressor 320 thus remains in an inactive state, such that vocal signals from receiver 300 cannot present.

Thus, an effective and useful half duplex control is desirable.

SUMMARY

Accordingly, an object of the invention is to provide a half duplex device, capable of half duplex control to a mobile communication device.

Another object of the invention is to provide a signal processing method, dynamically substituting a short-term power threshold value of a half duplex device for smooth performance in a noisy environment.

Accordingly, an embodiment of the invention provide a signal processing method for a signal detector of a half duplex device. First, a long-term power is obtained. A short-term power threshold is set as a default threshold. It is determined whether the long-term power is greater than the default threshold, and, if so, the short-term power threshold value is set equal to the long-term power value.

An embodiment of the invention further provides a half duplex device comprising a signal detector. The signal detector comprises a signal detection unit and a data update unit. The signal detection unit obtains a long-term power thereof. The data update unit sets the short-term power threshold as a default threshold, determines whether the long-term power is greater than the default threshold, and sets the short-term power threshold value equal to the long-term power value if the long-term power is greater than the default threshold.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

An embodiment of the invention discloses a half duplex device and signal processing method thereof.

Currently, a short-term power threshold and line deviation threshold of a signal detector of a half duplex device are predetermined. Neither of the predetermined values, however, may be applied with a noisy environment.

Figure 1:
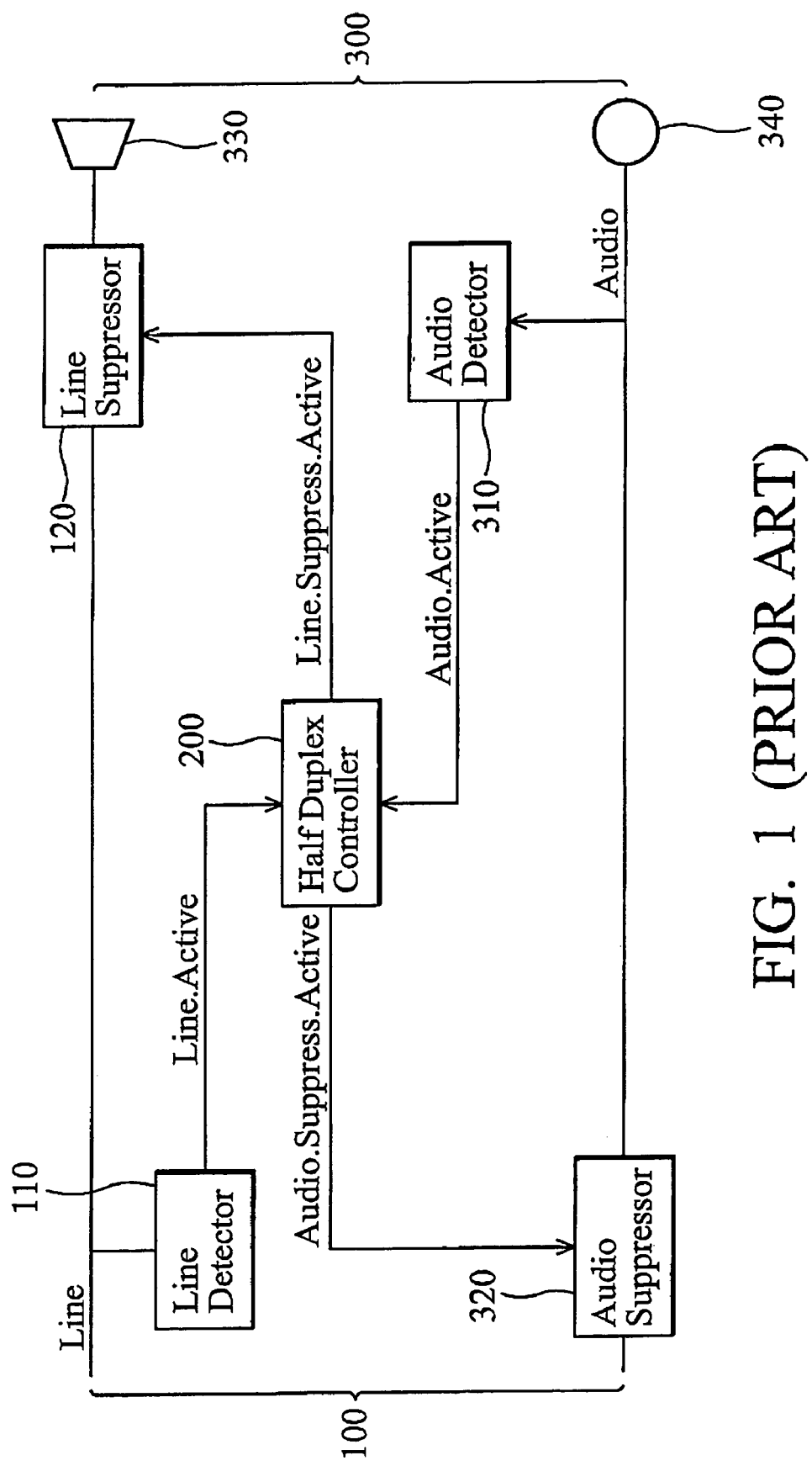
FIG. 1 is schematic diagram of the architecture of a conventional half duplex device.
Figure 2:
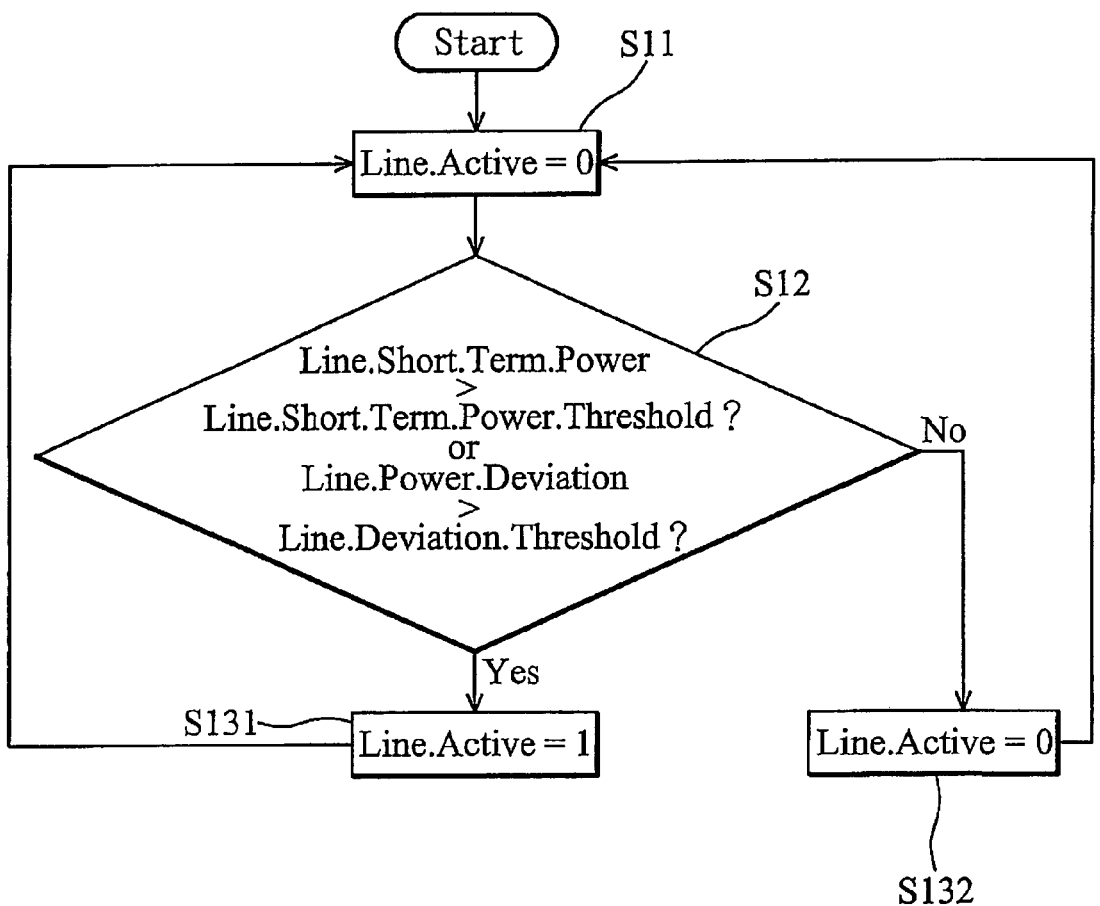
FIG. 2 is a flowchart of a signal processing method for the line detector shown in FIG. 1.
Figure 3:
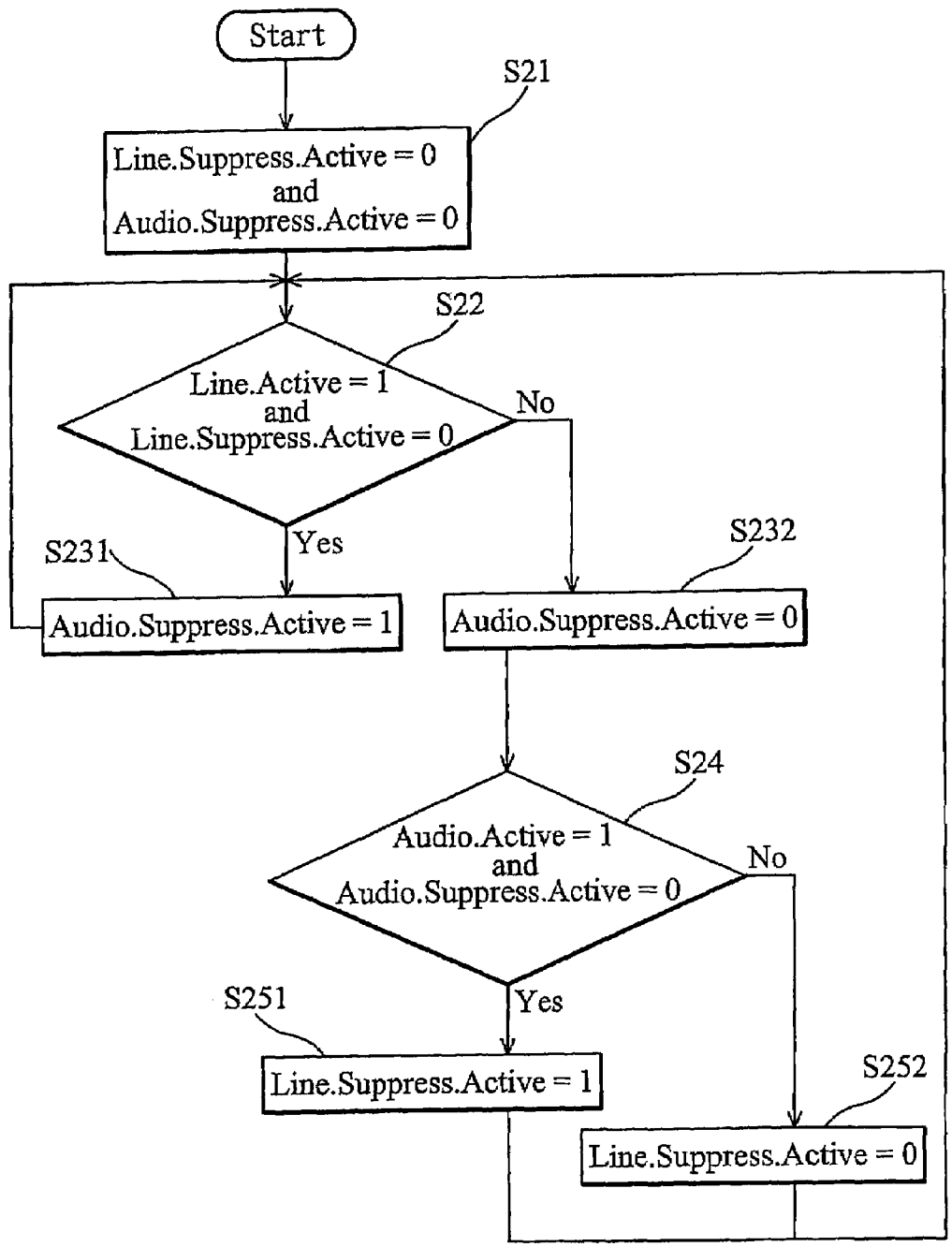
FIG. 3 is a flowchart of a signal processing method for a half duplex controller.
Figure 4A:
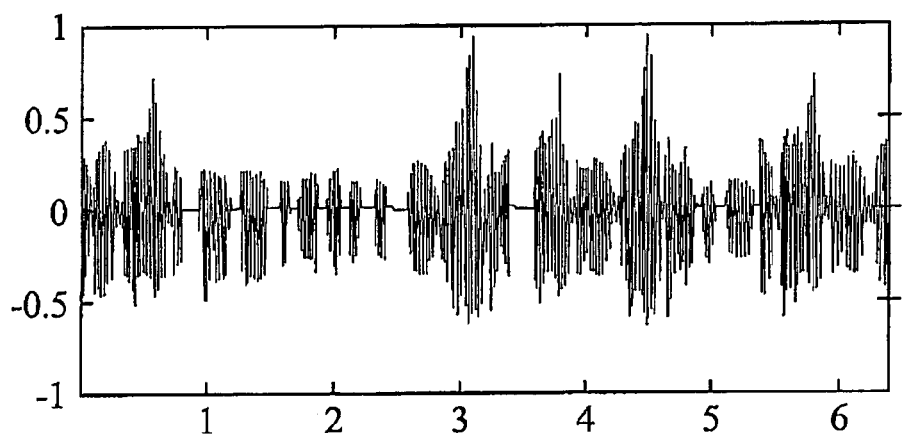
FIG. 4A is a schematic diagram of vocal signals from a remote user in noiseless environment.
Figure 4B:
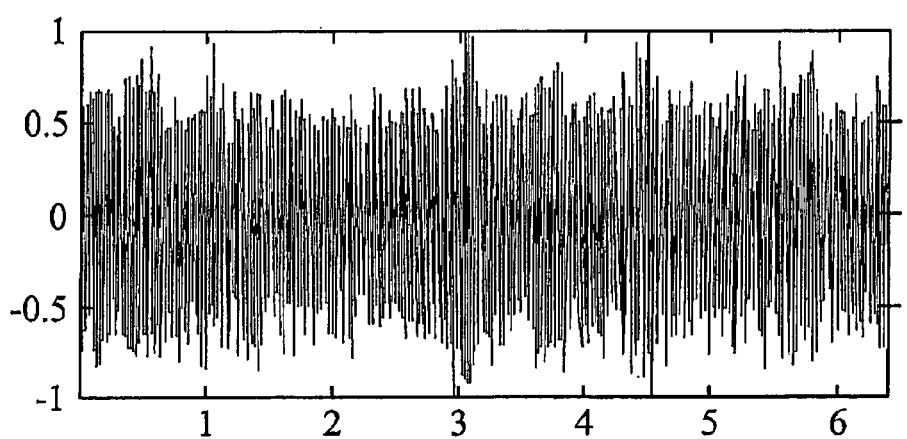
FIG. 4B is a schematic diagram of vocal signals from the remote user in a noisy environment.
Figure 4C:
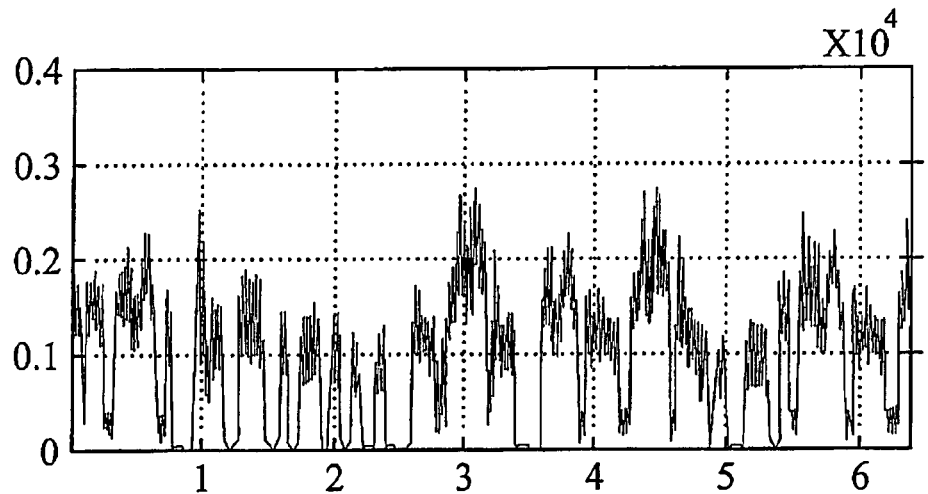
FIG. 4C is a schematic diagram of short-term power produced by vocal signals from the remote user in noiseless environment.
Figure 4D:
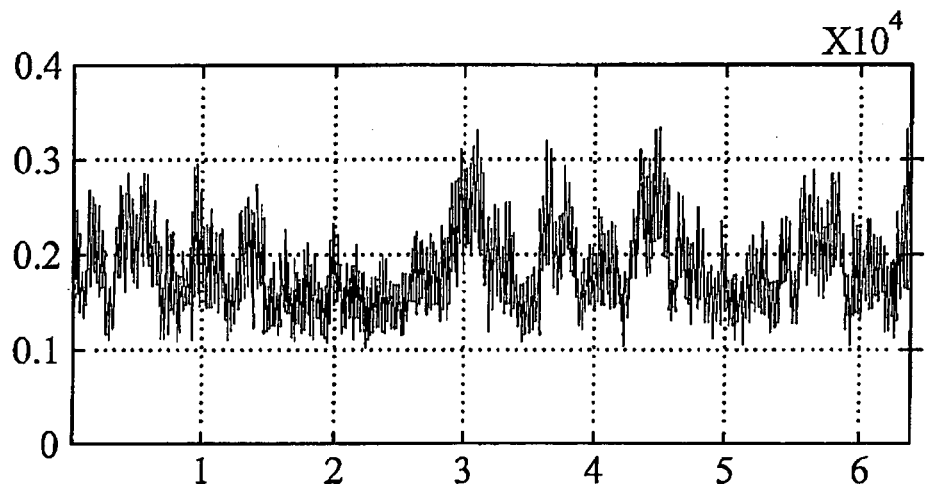
FIG. 4D is a schematic diagram of short-term power produced by vocal signals from the remote user in a noisy environment.
Figure 4E:
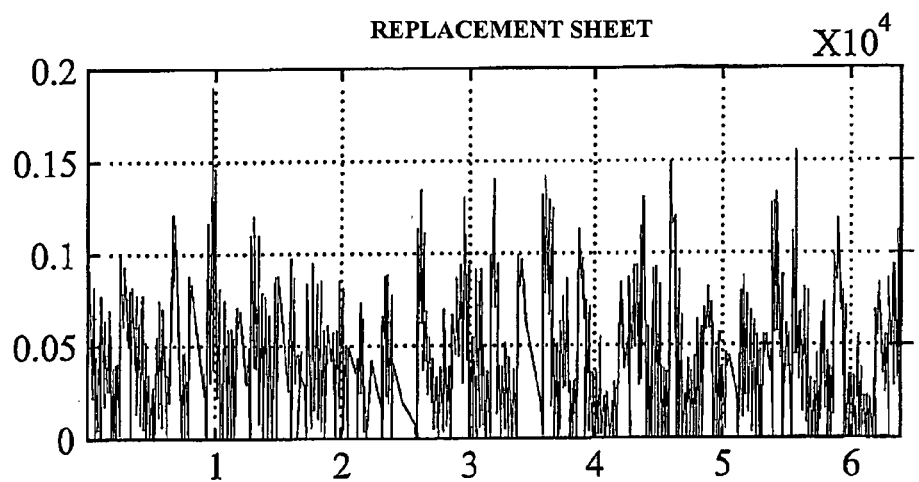
FIG. 4E is a schematic diagram of line power deviation values produced by vocal signals from the remote user in noiseless environment.
Figure 4F:
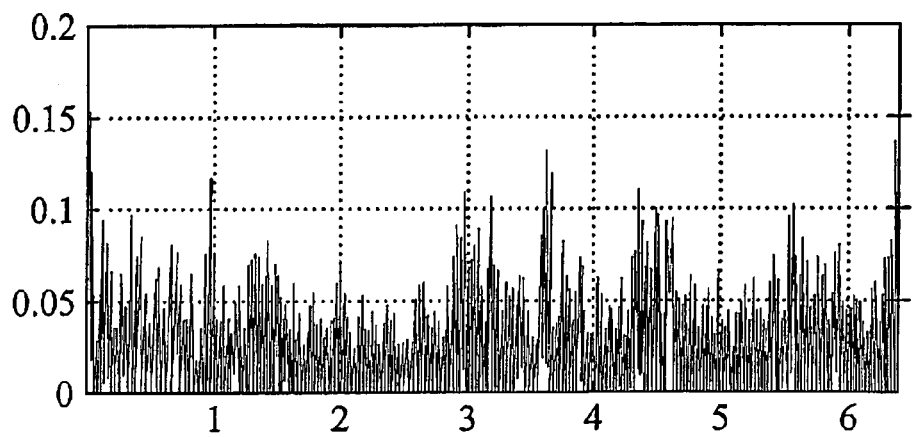
FIG. 4F is a schematic diagram of line power deviation values produced by vocal signals from the remote user in a noisy environment.

FIG. 4A is a schematic diagram of vocal signals from a remote user in noiseless environment. FIG. 4B is a schematic diagram of vocal signals from the remote user in a noisy environment. FIG. 4C is a schematic diagram of short-term power produced by vocal signals from the remote user in noiseless environment. FIG. 4D is a schematic diagram of short-term power produced by vocal signals from the remote user in a noisy environment. FIG. 4E is a schematic diagram of line power deviation values produced by vocal signals from the remote user in noiseless environment. FIG. 4F is a schematic diagram of line power deviation values produced by vocal signals from the remote user in a noisy environment.

Referring to FIGS. 4C and 4D, the average of the short-term power obviously increases in a noisy environment. Referring to FIGS. 4E and 4F, the line power deviation values have little change in a noisy environment due to the increase simultaneously of the long-term power and short-term power (a line power deviation is the modulus of the difference between a long-term power and a short-term power). Referring to FIGS. 4C~4F, the short-term power must correspondingly change according to environmental noise so that short-term power value produced by vocal signal from a remote user will not exceed the short-term power threshold value, such that vocal signals from a receiver cannot enter.

The signal processing method of an embodiment of the invention is described in the following. An embodiment of the invention only describes the process for detecting vocal signals from a remote user, and the described process by a receiver is identical.

Figure 5:
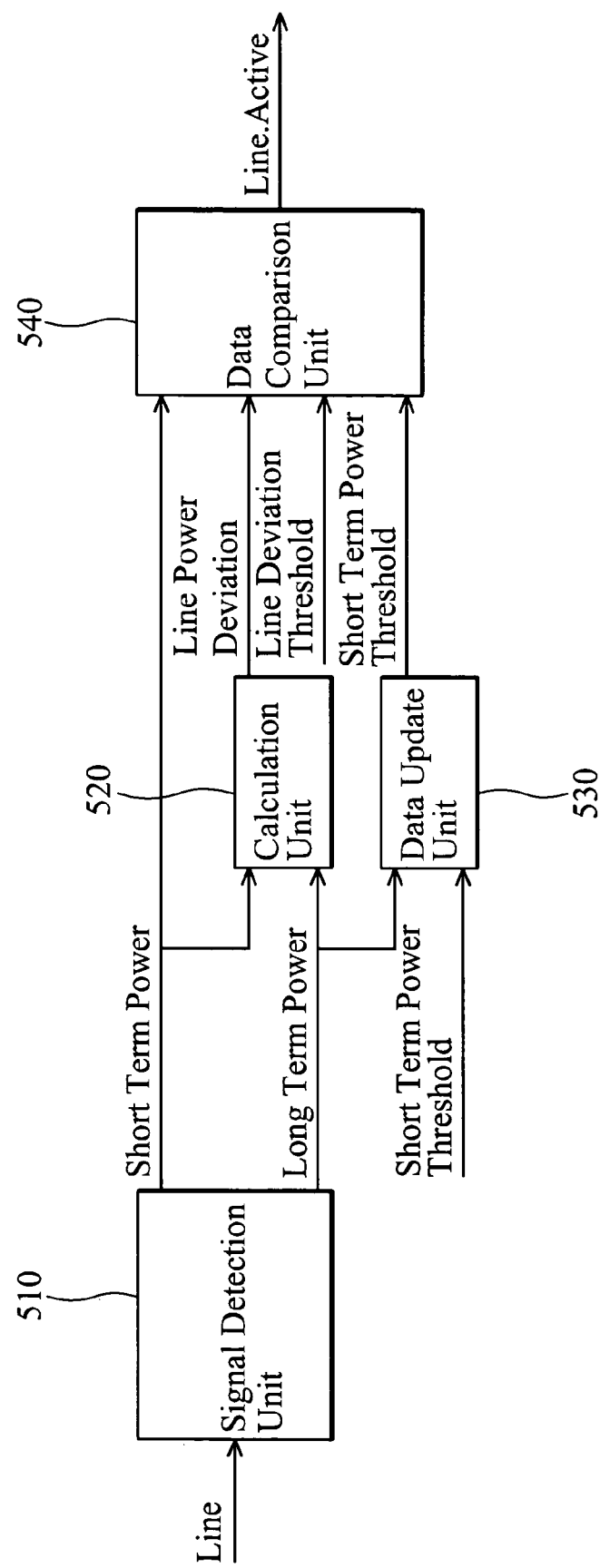
FIG. 5 is a schematic diagram of the architecture of a signal detector of a half duplex device of an embodiment of the invention.

FIG. 5 is a schematic diagram of the architecture of a signal detector of a half duplex device of an embodiment of the invention.

The signal detector comprises a signal detection unit 510, a calculation unit 520, a data update unit 530, and a data comparison unit 540. Signal detection unit 510 obtains a long-term power and a short-term power thereof, power calculation equations (1) and (2) are described in the following.

$$P_{short}(I) = P_{short}(I-1) + |line| \times 2^{TC1-16} - P_{short}(I-1)2^{TC1-16} \quad (1),$$

$$P_{long}(I) = P_{long}(I-1) + |line| \times 2^{TC1-16} - P_{long}(I-1)2^{TC2-16} \quad (2),$$

where $P_{short}$ and $P_{long}$ represent the short-term power and long-term power respectively, I represents a detection time, "line" indicates voice power detected from a far end, and TC1 and TC2 are time constants, in which TC1>TC2.

Calculation unit 520 obtains the short-term power and the long-term power from signal detection unit 510 for obtaining a line power deviation, the modulus of the difference between the long-term power and short-term power. Data update unit 530 sets a short-term power threshold as a default threshold, obtains the long-term power from signal detection unit 510, and determines whether the long-term power is greater than the default threshold. If the long-term power is greater than the default threshold, data update unit 530 sets the short-term power threshold value equal to the long-term power value.

Data comparison unit 540 obtains the short-term power from signal detection unit 510, the line power deviation from calculation unit 520, and the short-term power threshold from data update unit 530, and determines whether the short-term power value is greater than the short-term power threshold value. If so, data comparison unit 540 outputs Line.Active=1 to a half duplex controller of the half duplex device, indicating vocal signals from the remote user can enter. If not, data comparison unit 540 outputs Line.Active=0 to the half duplex controller, indicating vocal signals from the remote user cannot enter. Additionally, data comparison unit 540 further determines whether the line power deviation is greater than the line deviation threshold, determining whether vocal signals from the remote user can enter the half duplex device.

Figure 6:
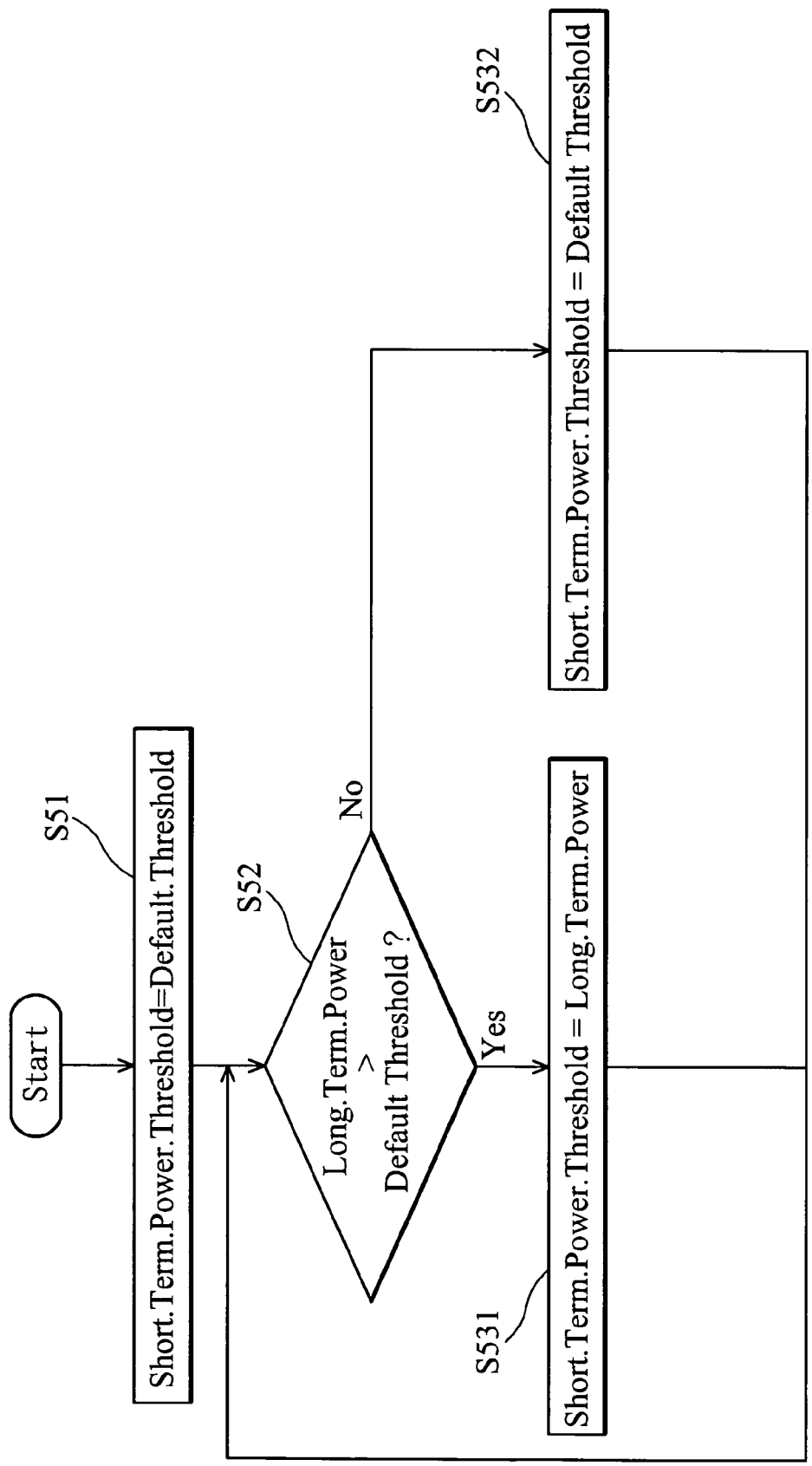
FIG. 6 is a flowchart of a signal processing method of an embodiment of the invention.

FIG. 6 is a flowchart of a signal processing method of an embodiment of the invention.

First, a long-term power and a short-term power are obtained through a signal detection unit of a half duplex device, and the short-term power threshold is set as a default threshold (Short.Term.Power.Threshold=Default.Threshold) (step S51). Next, it is determined whether the long-term power is greater than the default threshold (Long.Term.Power>Default.Threshold?) (step S52). If yes, the short-term power threshold value is set equal to the long-term power value (Short.Term.Power.Threshold=Long.Term.Power) (step S531), and the process proceeds to step S52 for continuation. If not, the default threshold value remains (Short.Term.Power.Threshold=Default Threshold) (step S532), and the process continuous to step S52.

An embodiment of the invention dynamically substitutes a short-term power threshold value of a half duplex device for smooth performance in a noisy environment, and provides smooth half duplex control for a mobile communication device.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal processing method for a signal detector of a half duplex device, dynamically substituting a short-term power threshold value of the signal detector, comprising the steps of:
    obtaining a long-term power;
    setting the short-term power threshold as a default threshold;
    determining whether the long-term power is greater than the default threshold;
    setting the short-term power threshold value equal to the long-term power value if the long-term power value is greater than the default threshold value;
    unchanging the default threshold value if the long-term power is smaller than the default threshold;
    repeating the determining and setting steps to change the short-term power threshold value at time intervals; and
    the half duplex device receiving or sending vocal signals according to the short-term power threshold value.

2. A half duplex device comprising a signal detector for dynamically substituting a short-term power threshold value thereof, the signal detector comprising:
    a signal detection unit, obtaining a long-term power thereof; and
    a data update unit, coupled to the signal detection unit, setting the short-term power threshold as a default threshold, determining whether the long-term power is greater than the default threshold, setting the short-term power threshold value equal to the long-term power value if the long-term power value is greater than the default threshold value, unchanging the default threshold value if the long-term power is smaller than the default threshold, repeating the determining and setting steps to change the short-term power threshold value at time intervals, and enabling the half duplex device to receive or send vocal signals according to the short-term power threshold value.

3. The device as claimed in claim 2, further comprising a data comparison unit, determining whether a short-term power value is greater than the short-term power threshold value, and outputting Line.Active=1 if the short-term power value is greater than the short-term power threshold value, or outputting Line.Active=0.

4. The device as claimed in claim 2, further comprising a calculation unit, calculating and obtaining a line power deviation according the long-term power and a short-term power from the signal detection unit.

5. The device as claimed in claim 2, further comprising a data comparison unit, determining whether a line power deviation is greater than a line deviation threshold, and outputting Line.Active=1 if the line power deviation is greater than the line deviation threshold, or outputting Line.Active=0.

* * * * *